E. S. ROBINSON.
Car Wheel.
No. 58,298.
Patented Sept. 25, 1866.
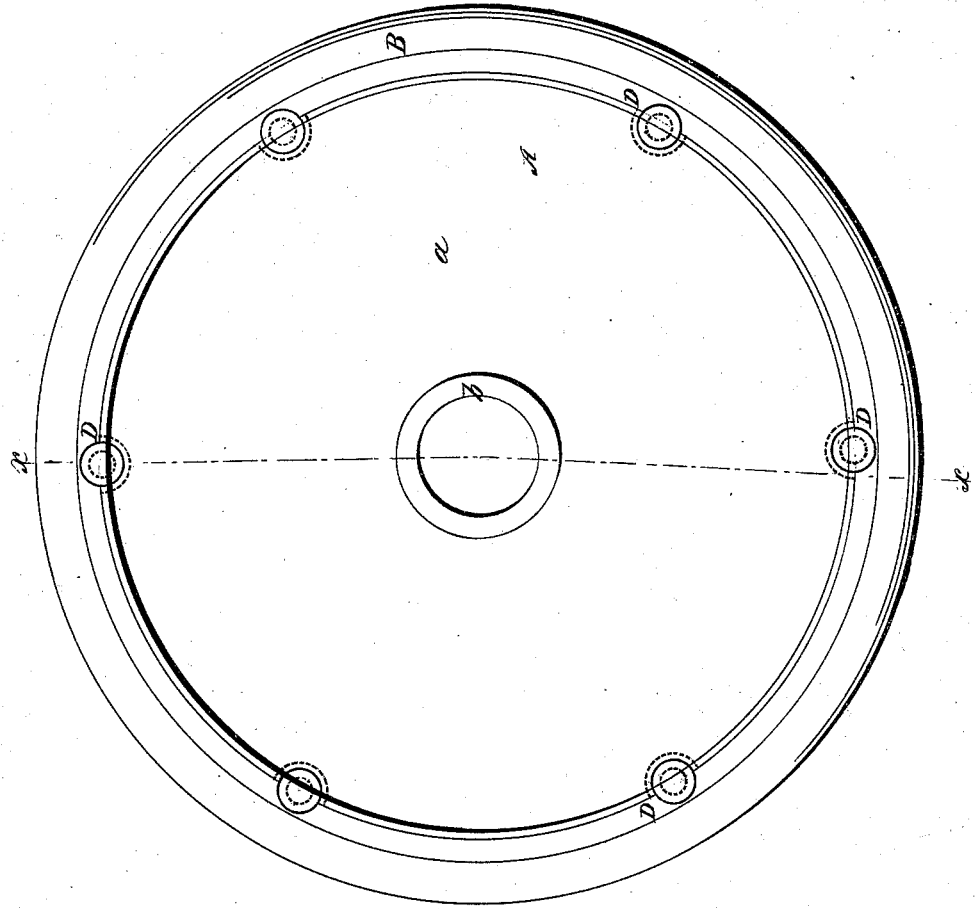
Witnesses:
Inventor:

UNITED STATES PATENT OFFICE.

E. S. ROBINSON, OF NEW YORK, N. Y.

IMPROVEMENT IN CAR-WHEELS.

Specification forming part of Letters Patent No. 58,298, dated September 25, 1866.

*To all whom it may concern:*

Be it known that I, E. S. ROBINSON, of the city, county, and State of New York, have invented a new and Improved Car-Wheel; and I do hereby declare that the following is a full, clear, and exact description thereof, which will enable others skilled in the art to make and use the same, reference being had to the accompanying drawings, forming part of this specification, in which—

Figure 1 is a side view of a wheel constructed according to my invention; Fig. 2, a central section of the same.

Similar letters of reference indicate like parts.

This invention has for its object the obtaining of a strong and durable car wheel by a very simple and economical mode of construction. To this end, the invention consists in having the body or main portion of the wheel of cast-iron, and composed of two plates of disk form, the convex surfaces being at the outer side, said plates being connected at their peripheries by cross-pieces, the two plates and cross-pieces being all cast in one piece. The tire or tread of the wheel is of wrought-iron or steel, and is secured upon the body or main portion by means of rivets, as hereinafter fully shown and described.

A represents the body or main portion of the wheel, composed of two parts, *a a*, of disk form, with their convex surfaces at their outer sides. These plates *a a* are connected centrally by a hub, *b*, and connected at their peripheries by cross-pieces *c*, the latter being parallel with the hub.

The plates *a a*, hub *b*, and cross-pieces *c* are all cast in one piece, and a free open space allowed between the two plates *a a*.

B represents the tire or tread of the wheel, constructed of wrought-iron or steel and fitted simply on the peripheries of the plates *a a*, and the outer surfaces of the cross-pieces *c*, the outer surfaces of the latter being flush with the outer surfaces or edges of the plates *a a*.

The tire or tread is secured on the body or main portion of the wheel by means of bolts or rivets D which pass through holes, one half of which are made in the inner edge or part of the tire or tread, and the other half in the cross-pieces *c* and edges of the plates *a a*, the holes being countersunk at their ends to admit of the ends of the rivets being headed flush with the sides of the tire or tread and plates, as shown in Fig. 2.

By this mode of construction a very strong and durable wheel is obtained. The plates *a a*, on account of their disk form, are allowed to yield or give, to a certain extent, so as to compensate for the expansion and contraction of the tire or tread, and thereby admit of the latter always fitting simply on the body or main portion of the wheel, and when the tire or tread becomes worn by use it may be readily detached and replaced by a new one.

This wheel possesses a great advantage over the ordinary car-wheels, cast entire, as the latter, in order to obtain durability, are cast with a "chill" to insure hardness, and that involves the necessity of a peculiar quality of iron being used if a good or perfect chill is desired. The chilled cast-iron, although hard, is brittle and liable to break or crack, a difficulty obviated by my invention.

Car-wheels, I am aware, have been constructed with a cast-iron body and wrought-iron or steel tire or tread, but not arranged like mine, no provision being made for the body or main portion of the wheel to yield or give under the expansion and contraction of the tire or tread.

I do not claim, broadly, a compound car-wheel—that is to say, a wheel having a cast-iron body or main portion with a wrought-iron or steel tire or tread fitted upon it, irrespective of the mode of construction herein shown and described.

I claim, therefore, as new and desire to secure by Letters Patent—

The plates *a a* and cross-piece *c* and hub *b* cast in one piece, forming the open space, as shown, in combination with the tire B, secured by rivets D, substantially as described, for the purpose specified.

ELIJAH S. ROBINSON.

Witnesses:
WM. F. MCNAMARA,
ALEX. F. ROBERTS.